United States Patent Office 2,983,698
Patented May 9, 1961

2,983,698
CURING OXIDIZED HYDROCARBON POLYMER FILMS

Merilyn A. Tucker, Cranford, and Ober C. Slotterbeck, Rahway, N.J., assignors to Esso Research and Engineering Company, a corporation of Delaware No Drawing. Filed Dec. 27, 1957, Ser. No. 705,498

4 Claims. (Cl. 260—39)

This invention relates to the curing of air-blown hydrocarbon drying oils and relates more particularly to the curing of thick films of such oils at ordinary or only slightly increased temperatures.

It is known to prepare films from liquid polymers of diolefins or copolymers of such diolefins with monomers copolymerizable therewith. These films have been cured by air drying or baking in an oven for about 30 minutes at 300°–350° F. However, it has not been possible to cure relatively thick films (more than 1.5 mils in thickness) of these oils with any degree of satisfaction.

Recently it has been found that reasonably thick films (1.5 to 3 mils) can be cured provided the oil is first oxidized to contain 10 to 20% oxygen by blowing with the air or oxygen at a temperature between 20° and 280° F. in the presence of a solvent. However, such oils even in the presence of a drier require at least 3 to 4 days to air dry.

Even more recently it has been found that thick films can be cured in a few minutes at ordinary or only slightly raised temperatures by contacting the film with gaseous sulfur dioxide as described in copending application Serial No. 649,639, filed April 1, 1957. Unfortunately, however, sulfur dioxide is toxic and when used in large amounts care must be taken to prevent serious complications from its use.

In accordance with the present invention, it has now been found that thick films can be cured (2 to 4 mils or thicker) in a reasonable time either by air drying or low temperature baking by adding a small amount of tetrachlorophthalic anhydride to the oxidized oil, preparing the film and curing to give hard, chemically resistant coatings of excellent clarity. These films are particularly advantageous in making white enamels. It has been found that with certain pigments in the white to yellow range some discoloration is noted when the films are cured at high temperatures, e.g. 300–350° F. Therefore, it has been difficult to get a white enamel which will not discolor at these high temperatures. However, with the addition of 1 to 2 weight percent tetrachlorophthalic anhydride to the pigmented resins, the films can be baked at 150–275° F. for 5 to 30 minutes instead of 300–350° F. In this way, the color of the original pigment is preserved and the same physical properties obtained. If colored pigments are used, discoloration is not so important and higher temperatures up to 350° F. may be employed with increased hardness.

The synthetic oils to which the present invention are applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 5–30% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight-run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight-run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product.

Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective.

The blowing of the above polymeric drying oils with air or oxygen is best carried out in a solvent of moderate to good solvency, e.g., solvents or solvent mixtures having a kauri-butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri-butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso-100 (a mixture of aromatic hydrocarbons boiling from about 150° to 175° C.), Solvesso-150 (a mixture of aromatic hydrocarbons boiling from about 190° to 210° C.), or mixtures thereof. Other suitable solvents include the Varsols which are straight-run mineral spirits boiling in the range of 140° to 205° C., having API gravities of 40 to 55 and varying in aromatic content from 5 to 35 weight percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxide such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalyst, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace of 20% or more.

According to this invention, tetrachlorophthalic anhydride is dissolved in a volatile hydrocarbon solvent such as toluene, benzene, solvent naphtha, Varsol, Solvesso-100, Solvesso-150 and the like, and added to the oxidized oil described above. The amount of tetrachlorophthalic anhydride added is fairly small, 1 to 2% based on the oxidized oil usually being sufficient. However, if the amount is increased to 3 to 20% the hardness of the films can be increased by increasing the time of cure, or the temperature of cure, or both.

Improved film properties can be obtained by the addition of cross-linking agents or promoters to the oxidized polymer prior to curing. These reagents include a class of polyfunctional compounds, such as polyamines, urea or phenolic formaldehyde resins and diisocyanates. Suitable resins include the melamine-formaldehyde resin known to the trade as Uformite MM46 (Rohm and Haas). Films containing from 10 to 15% of this are extremely mar resistant and can be baked at lower temperatures. This resin is prepared by reacting three molecules of formaldehyde with one molecule of melamine in accordance with methods known in the art (see for example U.S. Patent 1,633,337). The half-blocked isocyanate prepared from trimethylol propane and tolylene diisocyanate, wherein only one of the isocyanate radicals is reacted, is particularly effective for increasing film hardness values when post-cured with $SO_2$ at room temperatures as described in Serial No. 649,639 which is hereby incorporated by reference. Other blocked isocyanates prepared from alcohols, phenols or glycols are also effective.

The following specific examples are presented to illustrate the effects of the present invention. All quantities are expressed in this specification and claims on a weight basis unless stated otherwise.

*Example 1*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene, 100 KB value, n-heptane 25.4 KB value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poise at 50% N.V.M. in Varsol solution and the non-volatile portion thereof had an average molecular weight of about 3,000.

The polymer oil thus obtained was dissolved in Solvesso-150 (a substantially 100% aromatic hydrocarbon cut boiling 365°–415° F.) to make a 35% N.V.M. solution. It was then blown with air at about 230° F. until the oxygen content reached 16%.

Example II

Various amounts of tetrachlorophthalic anhydride were added to the blown oil of Example I. Films of the resulting blends were then laid down on sheet steel panels by means of a draw gage and the films cured by air-drying, oven-baking for 15 minutes at 160°, 200°, and 215° F., or by air-drying in the presence of $SO_2$ as described in Serial No. 649,639. The data obtained are shown in Table I.

These data show that considerably harder films can be obtained by curing in the presence of tetrachlorophthalic anhydride as compared to films omitting this material. These coatings may be used for internal pipecoatings, external pipecoatings, e.g. as primers, tank and drum linings, etc. Because of the excellent clarity of the films (they exhibit no discoloration after either air-drying or baking at moderately high temperatures), the coatings could also be used for furniture finishes and other applications where a clear coating is desirable.

Example III

The oxidized oils of Example I was mixed with 4.3% tetrachlorophthalic anhydride and made into an enamel with 20 vol. percent of $TiO_2$ pigment. Films having a thickness of 1.4 mils were laid down on panels. These panels were baked at 275° F. for 15 minutes and the film found to have a hardness of 46 (Sward).

Example IV

The oxidized oil of Example I was mixed with 5% of tetrachlorophthalic anhydride and 15% of a final stage melamine-formaldehyde resin known in the trade as Uformite MM46. This mixture was made into an enamel with 20 vol. percent of $TiO_2$ pigment and laid down on a steel panel as a film having a thickness of 3.2 mils. The panels were baked for 10 minutes at 300° F. and the film found to have a Sward hardness of 44 and were mar resistant.

Example V

The oxidized oil of Example I was mixed with 4.3% of tetrachlorophthalic anhydride and made into an enamel with 20 vol. percent $TiO_2$ pigment. A drier was added (0.02% cobalt naphthenate) and the enamel laid down on a steel panel as a film having a thickness of 2.6 mils. The panel was baked for 15 minutes at 275° F. and the film found to have a hardness of 40 Sward.

Example VI

The oxidized oil of Example I was mixed with 5% tetrachlorophthalic anhydride and 10% of the melamine-formaldehyde resin of Example III and formed into an enamel with 20 vol. percent of $TiO_2$ pigment. This enamel was laid down on a steel panel as a film having a thickness of 2.0 mils. After baking for 5 minutes at 260° F., it was found to be mar resistant and had a Sward hardness of 32.

Examples III, IV and V show that extremely hard films can be formed by the composition of the present invention, particularly if a melamine-formaldehyde resin is added to the recipe. The films containing the resin are particularly interesting in that they show up as completely mar resistant.

The nature of the present invention having been thus fully set forth and specific examples of the same given, what is claimed as new and useful and desired to be secured by Letters Patent is:

1. A process for improving the hardness of films prepared from oxidized liquid polymers chosen from the group consisting of oxidized homopolymers of butadiene-1,3 and copolymers of butadiene with 5–30% styrene having a molecular weight between 1,000 and 10,000, said oxidized polymers having been obtained by air blowing said liquid polymer with a gas chosen from the group consisting of air and oxygen in the presence of an aromatic hydrocarbon solvent having a kauri-butanol value of at least 40 and 0.001 to 1.0% of an organic salt of a metal chosen from the group consisting of cobalt, lead, iron, and manganese, which comprises adding 1 to 20% of tetrachlorophthalic anhydride to the oxidized polymer, applying a film of the resulting mixture to a surface and curing the said film by baking at 150°–350° F. for 5 to 30 minutes.

2. A composition of matter comprising a mixture of an oxidized liquid polymer chosen from the group consisting of oxidized homopolymers of butadiene-1,3, copolymers of butadiene with 5 to 30% styrene having a molecular weight between 1,000 and 10,000, said oxidized polymer containing 10 to 20% oxygen and having been obtained by air blowing said liquid polymer with a gas chosen from the group consisting of air and oxygen in the presence of an aromatic hydrocarbon solvent having a kauri-butanol value of at least 40 and 0.001 to 1.0% of an organic salt of a metal chosen from the group consisting of cobalt, lead, iron, and manganese, and 1

TABLE I

| Weight percent tetrachlorophthalic anhydride (based on oxidized oil solids) | Cure | Thickness (mils) | Sward hardness (days) | | | | | Chemical resistance [1] | | | |
|---|---|---|---|---|---|---|---|---|---|---|---|
| | | | 1 | 2 | 3 | 4 | 8 | $H_2O$ (5 hr.) | Grease (2 hr.) | Soap (2 hr.) | 1% NaOH (1 hr.) |
| 2.1 | Air dry | 1.1 | 4 | | | | 8 | | | | |
| 2.1 | 15′ at 200° F | 1.7 | 30 | | | | 36 | | | | |
| 2.1 | 15′–$SO_2$ | 1.4 | 8 | | | | 36 | | | | |
| 4.3 | Air dry | 1.6 | 2 | | | | 18 | | | | |
| 4.3 | 15′ at 200° F | 2.0 | 30 | | | | 8 | | | | |
| 4.3 | 15′–$SO_2$ | 1.9 | 4 | | | | 34 | | | | |
| 6.4 | Air dry | 1.6 | 4 | | | | 10 | | | | |
| 6.4 | 15′ at 200° F | 1.8 | 30 | | | | 8 | | | | |
| 6.4 | 15′–$SO_2$ | 1.8 | 4 | | | | 40 | | | | |
| 10.0 | Air dry | 0.9 | 8 | | | | 12 | | | | |
| 10.0 | 15′ at 200° F | 1.6 | 42 | | | | 16 | | | | |
| 10.0 | 15′–$SO_2$ | 1.6 | 8 | | | | 46 | | | | |
| 14.2 | Air dry | 2.4 | | 4 | | | 16 | | | | |
| 14.2 | 15′–160° F | 2.4 | | | | 12 | 18 | 0 | 0 | 1 | 0 |
| 14.2 | 15′–200° F | 2.2 | 40 | | | | 40 | 0 | 0 | 0 | 0 |
| 14.2 | 15′–$SO_2$ | 2.2 | 4 | | | 8 | 20 | 1 | 0 | 1 | 1 |
| 17.8 | Air dry | 1.5 | | 8 | | | 22 | | | | |
| 17.8 | 15′–160° F | 1.5 | | | | | 52 | 0 | 0 | 0 | 0 |
| 17.8 | 15′–200° F | 2.2 | 44 | | | 46 | 60 | 0 | 0 | 0 | 0 |
| 17.8 | 15′–$SO_2$ | 1.9 | 6 | | | 8 | 12 | 1 | 0 | 1 | 1 |
| Control [2] | Air dry | 1.5 | | | | 4 | | | | | |
| Do.[2] | 15′–200° F | 1.9 | | | | 14 | | | | | |
| Do.[2] | 30′–215° F | 0.95 | | | | 12 | | 3 | 0 | 0 | 1 |

[1] Ratings: 0 (unaffected), 1–3 (discolored and less adhesion), 4–6 (softened), 7–9 (failure by removal of film).
[2] Synthetic drying oil without the addition of tetrachlorophthalic anhydride.

to 20% of tetrachlorophthalic anhydride; said composition being capable, when laid down as a film on a surface, of curing to a hard, clear chemically resistant coating when heated for 5 to 30 minutes at 150°–350° F.

3. A mar resistant white enamel comprising an oxidized liquid copolymer of butadiene-1,3 with 5 to 30% styrene having a molecular weight between 1,000 and 10,000, said oxidized polymer containing 10 to 20% oxygen and having been obtained by air blowing said liquid polymer with a gas chosen from the group consisting of air and oxygen in the presence of an aromatic hydrocarbon solvent having a kauri-butanol value of at least 40 and 0.001 to 1.0% of an organic salt of a metal chosen from the group consisting of cobalt, lead, iron, and manganese, and 1 to 20% of tetrachlorophthalic anhydride; said composition being capable, when laid down as 2–4 mil films on a surface and baked for 5 to 10 minutes at 250°–300° F., of curing to a Sward hardness of at least 32.

4. A mar resistant white enamel comprising an oxidized liquid copolymer of butadiene-1,3 with 5 to 30% styrene having a molecular weight between 1,000 and 10,000, said oxidized polymer containing 10 to 20% oxygen and having been obtained by air blowing said liquid polymer with a gas chosen from the group consisting of air and oxygen in the presence of an aromatic hydrocarbon solvent having a kauri-butanol value of at least 40 and 0.001 to 1.0% of an organic salt of a metal chosen from the group consisting of cobalt, lead, iron, and manganese, and 1 to 20% of tetrachlorophthalic anhydride, 10 to 50% of a final stage melamine-urea formaldehyde resin; said composition being capable, when laid down as 2–4 mil films on a surface and baked for 5 to 10 minutes at 250°–300° F., of curing to a Sward hardness of at least 32.

References Cited in the file of this patent

UNITED STATES PATENTS

| | | |
|---|---|---|
| 2,625,523 | Garber et al. | Jan. 13, 1953 |
| 2,660,563 | Banes et al. | Nov. 24, 1953 |
| 2,829,130 | Greenspan et al. | Apr. 1, 1958 |

OTHER REFERENCES

Schildknecht: "Polymer Processes," Interscience Pub. Inc. N.Y., Feb. 26, 1956, pages 444–445, 458 and 467.